US008757836B2

(12) United States Patent
Kolodin et al.

(10) Patent No.: US 8,757,836 B2
(45) Date of Patent: Jun. 24, 2014

(54) OMNIDIRECTIONAL LED BASED SOLID STATE LAMP

(75) Inventors: Boris Kolodin, Beachwood, OH (US); Glenn H. Kuenzler, Beachwood, OH (US); Gary R. Allen, Chesterland, OH (US); Mark J. Mayer, Sagamore Hills, OH (US); Yiyu Cao, SangHai (CN)

(73) Assignee: GE Lighting Solutions, LLC, Cleveland, OH (US)

( * ) Notice: Subject to any disclaimer, the term of this patent is extended or adjusted under 35 U.S.C. 154(b) by 493 days.

(21) Appl. No.: 13/005,970

(22) Filed: Jan. 13, 2011

(65) Prior Publication Data
US 2012/0182711 A1 Jul. 19, 2012

(51) Int. Cl.
F21S 4/00 (2006.01)
F21V 21/00 (2006.01)
F21V 9/16 (2006.01)

(52) U.S. Cl.
USPC .................. 362/249.02; 362/800; 362/84

(58) Field of Classification Search
USPC ....................... 362/84, 249.02, 800
See application file for complete search history.

(56) References Cited

U.S. PATENT DOCUMENTS

| | | | |
|---|---|---|---|
| 6,465,961 B1 | 10/2002 | Cao | |
| 6,634,770 B2 | 10/2003 | Cao | |
| 6,661,167 B2 | 12/2003 | Eliashevich et al. | |
| 6,674,096 B2 | 1/2004 | Sommers | |
| 6,746,885 B2 | 6/2004 | Cao | |
| 7,021,797 B2 | 4/2006 | Minano et al. | |
| 7,224,000 B2 | 5/2007 | Aanegola et al. | |
| 7,224,001 B2 | 5/2007 | Cao | |
| 7,347,589 B2 | 3/2008 | Ge | |
| 7,497,596 B2 | 3/2009 | Ge | |
| 2006/0066218 A1* | 3/2006 | Yamaguchi et al. | 313/498 |
| 2006/0255353 A1 | 11/2006 | Taskar et al. | |
| 2007/0267976 A1 | 11/2007 | Bohler et al. | |
| 2010/0301356 A1 | 12/2010 | Scott et al. | |

FOREIGN PATENT DOCUMENTS

| | | |
|---|---|---|
| JP | 2010129300 A | 6/2010 |
| WO | WO 2004/021461 | 3/2004 |
| WO | 2009/091562 A2 | 7/2009 |
| WO | WO/2009/091562 | 7/2009 |
| WO | 2010/131166 A1 | 11/2010 |

OTHER PUBLICATIONS

PCT Search Report and Written Opinion dated Apr. 5, 2012 from corresponding Application No. PCT/US2011/065441.

* cited by examiner

*Primary Examiner* — Anh Mai
*Assistant Examiner* — Zachary J Snyder
(74) *Attorney, Agent, or Firm* — Fay Sharpe LLP

(57) ABSTRACT

A lighting apparatus includes a bilaterally symmetrical light engine comprising first and second light emitting diode (LED) devices or planar LED device arrays facing opposite directions, and an envelope including phosphor spaced apart from and surrounding the bilaterally symmetrical light engine. The phosphor is effective to convert light emitted by the light engine to emission light. The bilaterally symmetrical light engine may be configured to emit light having a bilaterally symmetrical intensity distribution that is uniform except at emission angles within 10° of the symmetry plane of the bilaterally symmetrical light engine. Each of the first and second LED devices or planar LED device arrays may comprise at least one hemispherically emitting LED device including an LED chip and an encapsulant encapsulating the LED chip and shaped to refract light emitted by the LED chip into a uniform distribution over a hemispherical solid angle.

18 Claims, 3 Drawing Sheets

US 8,757,836 B2

OMNIDIRECTIONAL LED BASED SOLID STATE LAMP

BACKGROUND

The following relates to the illumination arts, lighting arts, solid-state lighting arts, and related arts.

Light emitting diode (LED) devices are known for lighting applications. However, a problem with LED devices is that they tend to emit a forward-directed and "peaked" light distribution, for example a Lambertian light distribution, whereas many lamps and lighting applications call for omnidirectional illumination. An ideal omnidirectional illuminator would generate light with precisely the same intensity in every direction over a full sphere. As used in the lighting arts, the term "omnidirectional" illumination encompasses practical approximations to the ideal omnidirectional illumination. By way of illustrative example, some incandescent lamps considered to be omnidirectional light sources provide illumination across the latitude span $\theta=[0°, 135°]$ which is uniform to within about ±20% as specified in the proposed Energy Star standard for Integral LED Lamps ($2^{nd}$ draft, May 9, 2009; hereinafter "proposed Energy Star standard") promulgated by the U.S. Department of Energy. This is generally considered an acceptable illumination distribution uniformity for an omnidirectional lamp, although there is some interest in extending this to a more stringent specification, such as to a latitude span of $\theta=[0°, 150°]$ and possibly with a better ±10% uniformity. Such lamps with substantial uniformity over a large latitude range (for example, about $\theta=[0°, 120°]$ or more preferably about $\theta=[0°, 135°]$ or still more preferably about $\theta=[0°, 150°]$) are generally considered in the art to be omnidirectional lamps, even though the range of uniformity is less than $[0°, 180°]$ as would be the case for ideal omnidirectionality.

To construct an LED-based omnidirectional lamp, it is known to employ an array of LED devices mounted on a spherical or otherwise-shaped three-dimensional surface generally centered within an envelope containing a phosphor. Examples of such devices are disclosed, by way of illustrative example, in: Cao, U.S. Pat. No. 6,465,961; Cao, U.S. Pat. No. 6,634,770; Cao, U.S. Pat. No. 6,746,885; Cao, U.S. Pat. No. 7,224,001; Ge, U.S. Pat. No. 7,347,589; and Ge, U.S. Pat. No. 7,497,596. Such devices enable precise tailoring of the light distribution using the shape of the spherical or other LED device mounting surface, the distribution of LED devices on that mounting surface, and the shape and spacing from the mounting surface of the envelope containing phosphor.

However, such devices have certain disadvantages. Manufacturing is complicated since the mounting surface must be formed with the requisite three-dimensional shape and must include printed circuit traces or other wiring for electrically interconnecting the LED devices over this three-dimensional surface. Cost is increased due to the custom-manufactured three-dimensional mounting surface including the requisite printed circuitry or other wiring. Moreover, such lamps employ a substantial number of LED devices, typically of order six or more LED devices. This increases cost as compared with using a fewer number of high power LED devices.

Other known approaches employ a single LED mounted in a spherical envelope including a phosphor. Examples of such devices are disclosed, by way of illustrative example, in: Soules et al., International Publication no. WO 2004/021461 A2 and Eliashevich et al., U.S. Pat. No. 6,661,167. Some embodiments disclosed in this patent employ a single LED device centered in a spherical encapsulant, which may include a phosphor. While such a device can emit omnidirectional illumination, it may be difficult to design the device to meet more stringent omnidirectional light distribution specifications.

Yet another approach is to employ one or more LED devices mounted at a peripheral location or aperture of a spherical envelope containing phosphor. The spherical envelope complements the Lambertian light distribution generated by the LED devices to produce omnidirectional light. Examples of such devices are disclosed, by way of illustrative example, in Bohler et al., U.S. Pub. No. 2007/0267976 A1.

Still yet another approach is to shape the encapsulant to provide more omnidirectional illumination. Examples of such devices are disclosed, by way of illustrative example, in Sommers, U.S. Pat. No. 6,674,096. While such a device can emit omnidirectional illumination, it may be difficult to design the device to meet more stringent omnidirectional light distribution specifications, especially with respect to latitude angles greater than 180°. Further, it is difficult to extend the approach to lamps employing multiple LED devices.

BRIEF SUMMARY

In some embodiments disclosed herein as illustrative examples, an apparatus comprises a light engine comprising first and second light emitting diode (LED) devices or planar LED device arrays arranged to emit light in opposite directions, and a surrounding envelope including phosphor. The light engine is disposed at the center of the surrounding envelope, and the phosphor is effective to convert light emitted by the light engine to emission light. In some such apparatus, the light engine is bilaterally symmetric about a symmetry plane with the first LED device or planar LED device array and the second LED device or planar LED device array on opposite sides of the symmetry plane. In some such apparatus, each of the first and second LED devices or planar LED device arrays is configured to emit light having a uniform intensity distribution over a hemispherical solid angle except proximate to the symmetry plane. In some such apparatus each of the first and second LED devices or planar LED device arrays comprises at least one hemispherically emitting LED device including an LED chip and an encapsulant encapsulating the LED chip and shaped to refract light emitted by the LED chip into a uniform distribution over a hemispherical solid angle.

In some embodiments disclosed herein as illustrative examples, an apparatus comprises a bilaterally symmetrical light engine comprising first and second light emitting diode (LED) devices or planar LED device arrays facing opposite directions, and an envelope including phosphor spaced apart from and surrounding the bilaterally symmetrical light engine. The phosphor is effective to convert light emitted by the light engine to emission light. In some such apparatus, the bilaterally symmetrical light engine is configured to emit light having a bilaterally symmetrical intensity distribution that is uniform except at emission angles within 10° of the symmetry plane of the bilaterally symmetrical light engine.

In some embodiments disclosed herein as illustrative examples, an apparatus comprises: a bilaterally symmetrical light engine comprising first and second light emitting diode (LED) devices or planar LED device arrays facing opposite directions and configured to emit light having a bilaterally symmetrical intensity distribution that is uniform except at emission angles within 10° of the symmetry plane of the bilaterally symmetrical light engine; a surrounding envelope including phosphor, the light engine disposed at the center of and spaced apart from the surrounding envelope, the phosphor being effective to convert light emitted by the light engine to emission light; and a post passing through the surrounding envelope, the bilaterally symmetrical light engine being mounted on an end of the post.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF PREFERRED EMBODIMENTS

Figure 1:
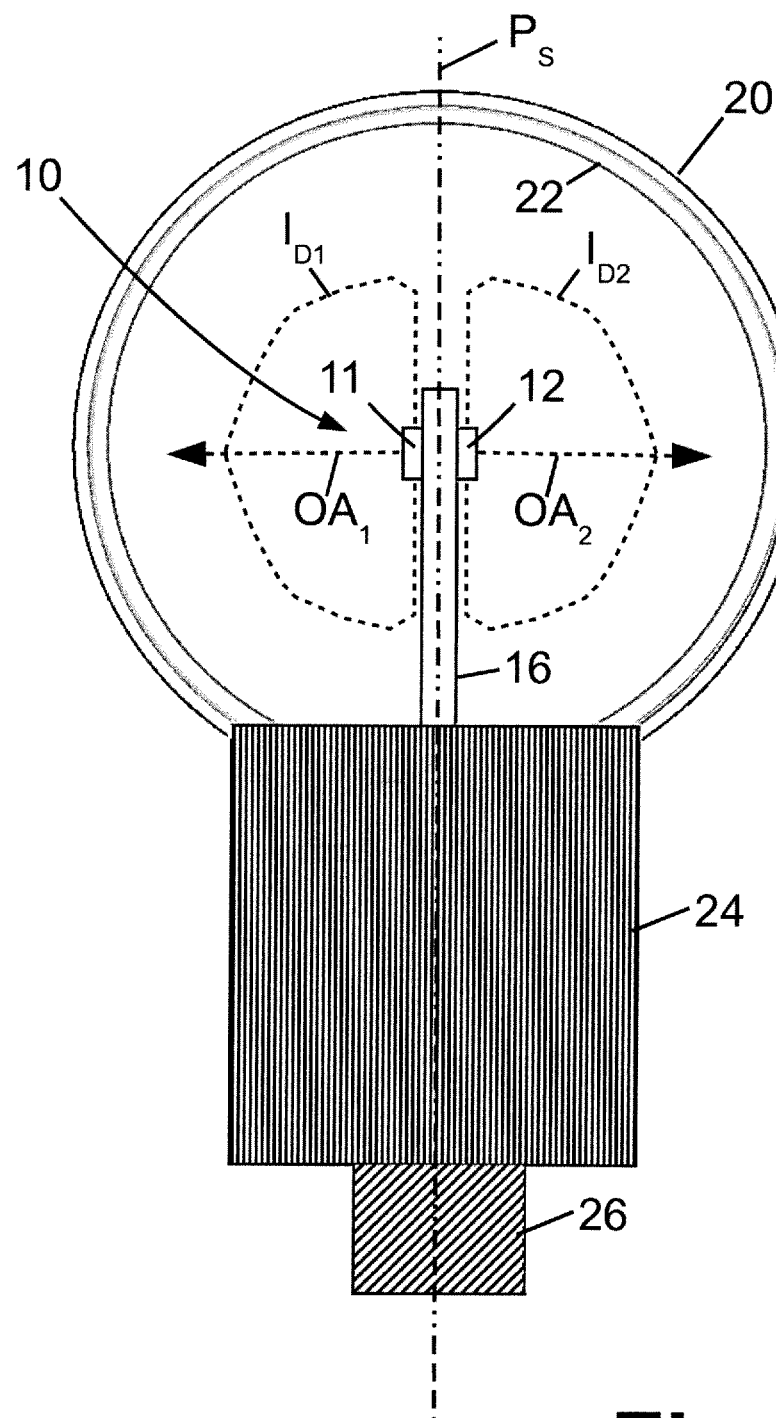
FIG. 1 diagrammatically shows a lighting apparatus including a bilaterally symmetrical light engine comprising first and second planar light emitting diode (LED) device arrays and a surrounding enclosure including phosphor.

With reference to FIG. 1, a lamp or other lighting apparatus includes a light engine 10 comprising a first light emitting diode (LED) device or LED device array 11 and a second, oppositely facing LED device or LED device array 12. The light engine 10 is mounted on the end of a post 16 and is surrounded by an envelope 20 including a phosphor 22 that is effective to convert light emitted by the light engine 10 to emission light. In some embodiments, the light engine 10 emits blue, violet, or ultraviolet light and the phosphor 22 converts the blue, violet, or ultraviolet light emitted by the light engine 10 to white emission light. In some embodiments, a portion of the light emitted by the light engine 10 passes through the phosphor 22 to contribute to the emission light. For example, the light engine 10 may emit blue or violet light, the phosphor 22 may be tuned to emit warm white light (that is, white light with a spectrum that is biased toward the red end), and a portion of the blue or violet light leaks through the phosphor to balance the reddish white phosphor emission. The LED devices of the light engine 10 may, by way of illustrative example, be gallium nitride (GaN)-based LED devices. These are merely illustrative examples, and emission light with other characteristics is also contemplated, such as emission light of a particular color rather than white emission light.

The envelope 20 may be made of substantially any material that is transparent for the emission light. For example, the envelope 20 may be a transparent plastic or glass envelope. The envelope 20 may optionally include a diffusive texturing or frosting, and may optionally include one or more optical coatings in addition to the phosphor 22, such as an antireflective (AR) coating. The illustrative phosphor 22 is coated on an inner surface of the envelope 20 which has an advantage in protecting the phosphor 22, but more generally the phosphor may be disposed on an inner surface of the envelope, disposed on an outer surface of the envelope, embedded in the material of or otherwise disposed inside the envelope, or arranged in some combination of the foregoing. In some embodiments, the phosphor 22 in combination with diffusive texturing or frosting provides the envelope 20 with a whitish appearance when the lamp is off (that is, when the light engine 10 is not energized to generate light). Such a whitish appearance is generally considered to be aesthetically pleasing.

The first and second LED devices or LED device arrays 11, 12 are oppositely facing and consequently emit light in opposite directions. Said another way, the first LED device or LED device array 11 emits light centered along an optical axis $OA_1$, and the second LED device or LED device array 12 emits light centered along an optical axis $OA_2$ that is opposite the optical axis $OA_1$. It is to be understood, however, that the first and second LED devices or LED device arrays 11, 12 in general emit light over a large angular range centered along respective optical axes $OA_1$, $OA_2$, and in some embodiments each device or device array 11, 12 emits light over a hemispherical (or nearly hemispherical) solid angle. Thus, as diagrammatically indicated in the illustrative example of FIG. 1, the first LED device or LED device array 11 emits light having a spatial intensity distribution $I_{D1}$ which is substantially hemispherical and centered on the optical axis $OA_1$, and the second LED device or LED device array 12 emits light having a spatial intensity distribution $I_{D2}$ which is also substantially hemispherical but centered on the oppositely directed optical axis $OA_2$. The light engine 10 is bilaterally symmetric about a symmetry plane $P_S$ (which is seen "on edge" in FIG. 1 and hence appears as a line in FIG. 1), with the two optical axes $OA_1$, $OA_2$ being transverse to the symmetry plane $P_S$.

The light engine 10 generates heat. In some embodiments, the LED devices or LED device arrays 11, 12 operate at sufficiently low power so as to not employ cooling apparatus. For higher power embodiments, some cooling apparatus is suitably employed. In the illustrative example, the post 16 on which the light engine 10 is mounted is embodied as a heat pipe to draw heat away from the light engine 10. The end of the heat pipe/post 16 opposite to the end at which the light engine 10 is mounted terminates in a heat sink 24, which optionally may include fins or other heat radiating/convecting elements (not shown in FIG. 1). The heat sink 24 may optionally also house electronics (not shown) for driving the light engine 10. In such embodiments, a lamp base 26 is suitably configured to deliver electrical power to the electronics in the heat sink. For example, in some contemplated embodiments the lamp base 26 is an Edison-type threaded base delivering 110 $V_{AC}$ power to the electronics which convert that 110 $V_{AC}$ power to DC power suitable for driving the light engine 10. In other embodiments the lamp base 26 may be a GU-type base or other suitable base. Although the heat sink 24 is shown by way of illustrative example, additional or other cooling apparatus are also contemplated, such as a synthetic jet (not shown), for example employing the envelope 20 as an enclosed volume upon which the synthetic jet operates.

Figure 2:
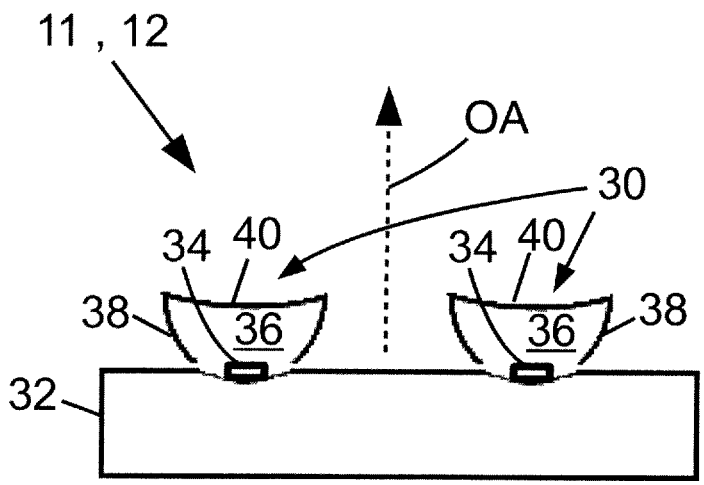
FIGS. 2 and 3 diagrammatically show side and plan views, respectively, of one of the planar LED device arrays of the lighting apparatus of FIG. 1.
Figure 3:
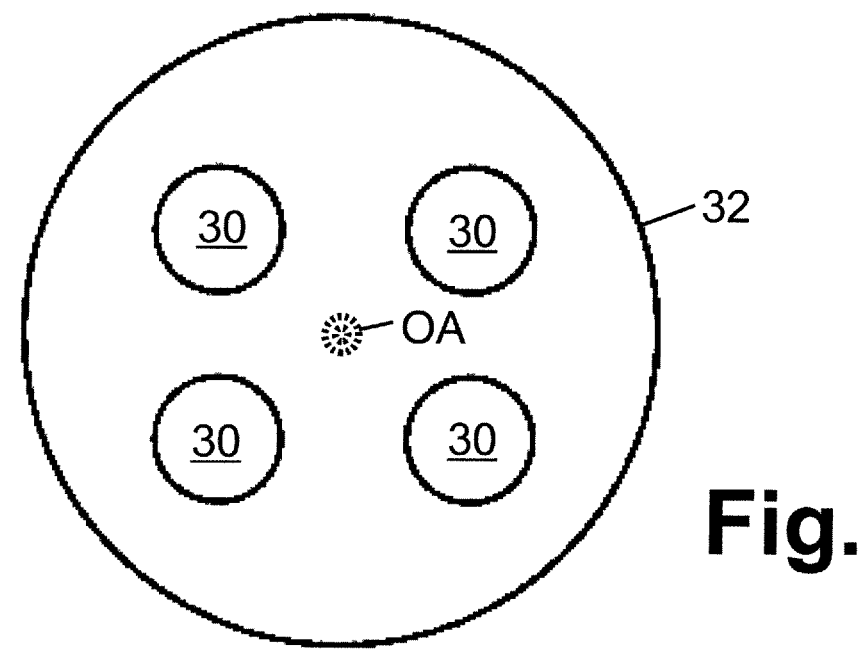

With continuing reference to FIG. 1 and with further reference to FIGS. 2 and 3, an illustrative embodiment of the first (or, alternatively second) LED device or LED device array 11, 12 is shown. In FIGS. 2 and 3, the optical axis is generically labeled as axis OA, and represents the first optical axis $OA_1$ in the case of the first LED device or LED device array 11, or the second optical axis $OA_2$ in the case of the second LED device or LED device array 12. In the illustrative example of FIGS. 2 and 3, each LED device or LED device array 11, 12 comprises an array of four LED devices 30 arranged on a substrate 32, which may by way of illustrative example be a metal-core printed circuit board (MC-PCB). As best seen in FIG. 2, each LED device 30 includes a light emitting diode (LED) chip 34, which may by way of illustrative example comprise a gallium nitride (GaN)-based LED chip, that is encapsulated by a cusped encapsulant 36. The cusped encapsulant 36 includes a convex annular sidewall 38 that is undercut proximate to the board 32, and a shallowly concave upper surface 40.

Figure 4:
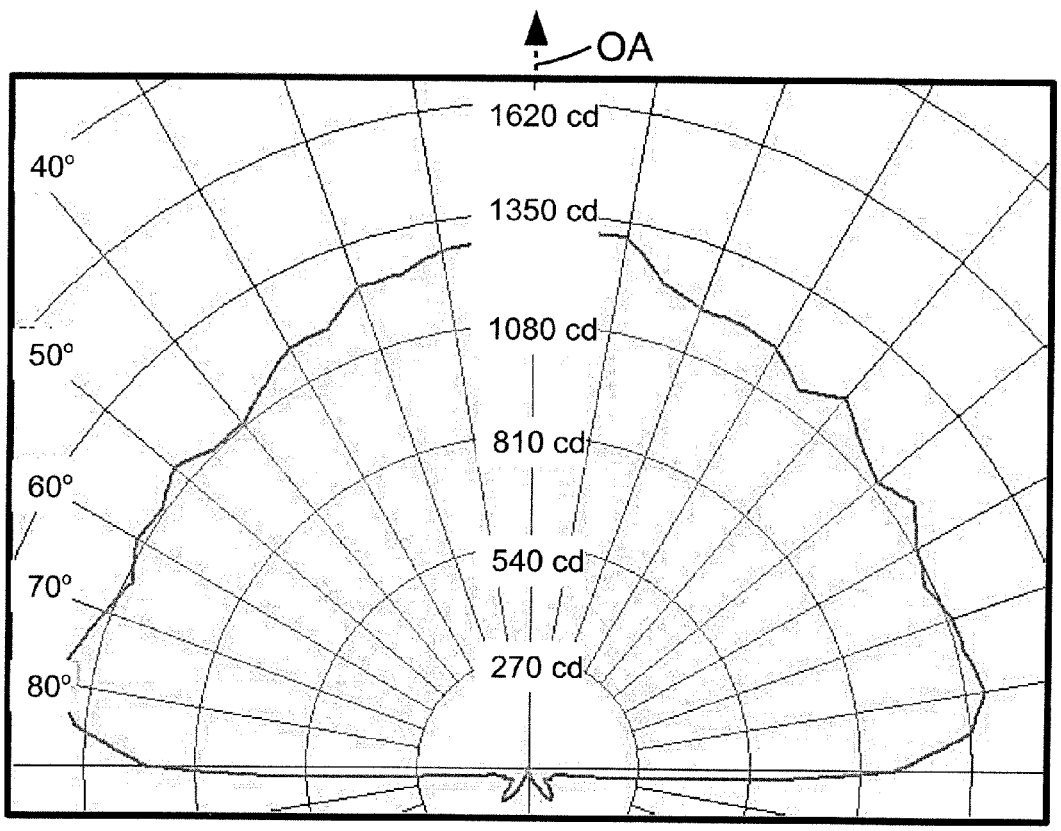
FIG. 4 plots a far-field intensity distribution for an LED device having spatial intensity distribution that is uniform except proximate to the symmetry plane and that is suitable for use in the light engine of FIG. 1.

With reference to FIG. 4, by suitable configuration of the refractive surfaces 38, 40 respective to the LED chip 34, and further accounting for the refractive index of the encapsulant material for light emitted by the LED chip 34, the LED devices 30 can be configured to emit light having a uniform intensity distribution over a hemispherical solid angle except proximate to the symmetry plane (for example, corresponding to the hemispherical distributions $I_{D1}$, $I_{D2}$ diagrammatically shown in FIG. 1). By way of illustrative example, FIG. 4 shows a polar curve generated by a ray tracing simulation of the light intensity distribution for the LED device 30, in which the refractive surfaces 38, 40 have been optimized respective to uniformity of the hemispherical intensity distribution. It is seen that the spatial intensity distribution is uniform to within plus or minus 20%, excluding light emission angles within 10° of the symmetry plane.

With returning reference to FIG. 1, the two spatial intensity distributions $I_{D2}$ together form a bilaterally symmetrical intensity distribution. In embodiments in which the first and second LED devices or LED device arrays 11, 12 are configured to emit light having respective spatial intensity distributions $I_{D1}$, $I_{D2}$ that are uniform except proximate to the symmetry plane $P_S$, the result is omnidirectional illumination of highly uniform intensity, except possibly for light proximate to (e.g., within 10° of) the symmetry plane $P_S$. However, intensity proximate to the symmetry plane $P_S$ can be made more uniform by adjustment of the sidewalls 38 of the cusped encapsulant 36, and optionally by providing high reflectivity for the board 32 (for example, by adding a reflective silver coating or so forth) to capture additional side-emitted light. Another approach is to add light diffusion in the envelope 20 where the symmetry plane $P_S$ intersects the envelope 20 in order to enhance light uniformity.

The uniform omnidirectional illumination generated by the illustrative bilaterally symmetrical light engine 10 comprising first and second light emitting diode (LED) devices or planar LED device arrays 11, 12 facing opposite directions illuminates the envelope 20 including phosphor 22 which is spaced apart from and surrounds the bilaterally symmetrical light engine 10. The phosphor 22 is effective to convert light emitted by the light engine to emission light. If the envelope 20 including phosphor 22 is spherical with the light engine located at the center of the spherical envelope, then the emission light is also emitted outwardly from the envelope 20 with a uniform spherical intensity distribution, so that the lamp shown in FIG. 1 is an omnidirectional illumination apparatus.

The omnidirectionality of the lamp of FIG. 1 is reduced by shadowing caused by the heat sink 24. However, this shadowing can be reduced by increasing the length of the post 16 so as to provide further separation between the light engine 10 and the heat sink 24, and/or by reducing a lateral extent of the heat sink 24 away from the axis of the post 16. Another contemplated correction is to move the light source 10 slightly downward (that is, the light source is located at the center of the surrounding envelope but slightly offset from the precise center of the spherical envelope 20 in the direction toward the heat sink 24). Such an offset slightly increases the intensity of illumination from the portion of the envelope 20 closest to the heat sink 24 while slightly decreasing the intensity of illumination from the portion of the envelope 20 furthest from the heat sink 24. This provides some compensation for the shadowing by the heat sink 24. Another contemplated correction is to modify the shape of the envelope 20. By making the envelope 20 "egg-shaped" with the portion of the envelope 20 furthest from the heat sink 24 being elongated or prolate and the portion of the envelope 20 closest to the heat sink 24 being flattened or oblate, a similar effect of slightly increasing intensity from the portion of the envelope 20 closest to the heat sink 24 while slightly decreasing intensity from the portion of the envelope 20 furthest from the heat sink 24 is again achieved.

Figure 5:
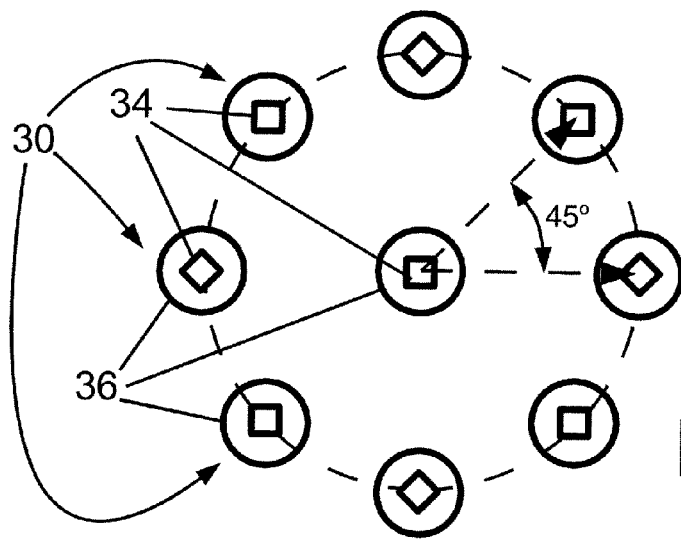
FIG. 5 diagrammatically shows a plan view of another suitable planar LED device array including nine LED devices.

With reference to FIGS. 4 and 5, the illustrative LED devices 30 including the cusped encapsulant 36 have been found, based on ray tracing simulations, to provide a uniform hemispherical intensity distribution, as illustrated in FIG. 4 which shows the intensity distribution for a variant LED device array shown in FIG. 5, which includes nine LED devices and is suitably used in some embodiments as the first and second LED device arrays 11, 12. However, other configurations for the first and second LED devices or LED device arrays 11, 12 can be employed to provide a uniform intensity distribution over a hemispherical solid angle (except possibly proximate to the symmetry plane). For example, Sommers, U.S. Pat. No. 6,674,096 discloses a variant LED device in which the front surface 42 of the encapsulant 36 is partially or wholly diffusely or specularly reflective so as to increase the proportion of side-emitted light as compared with front-emitted light. Some such embodiments also employ a deeper concavity of the front surface, in some embodiments forming a conical or other deep indentation of the front surface. In other embodiments, the first and second LED devices or LED device arrays 11, 12 include additional optical components. For example, in a contemplated variant the encapsulant 36 is replaced by (or in other embodiments augmented by) an optical element (not shown) such as a lens, diffuser, or so forth to refract, scatter, or otherwise spread or distribute light toward the target hemispherical hemispherical distributions $I_{D1}$, $I_{D2}$.

With continuing reference to FIG. 5, it is also to be appreciated that the LED devices or device arrays 11, 12 can have various numbers of LED devices. FIG. 5 shows an alternative LED device array including nine LED devices 30 arranged with one centrally located LED device 30 and eight peripherally located LED devices 30 arranged at 45° angular intervals around the centrally located LED device 30. The illustrative LED devices 30 shown in FIG. 5 include LED chips 34 having square shapes. To reduce any anisotropy in the light emission due to the square chips, the chips at angular positions 0°, 90°, 180°, and 270° are rotated by 45°. On the other hand, in some embodiments each LED device or device array 11, 12 may include as few as a single LED device. As seen in FIG. 4, this nine-chip array can provide a highly uniform hemispherical light distribution.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:
1. An apparatus comprising:
a light engine comprising first and second light emitting diode (LED) devices or planar LED device arrays arranged to emit light in opposite directions, the light engine being bilaterally symmetric about a symmetry plane with the first LED device or planar LED device array and the second LED device or planar LED device array on opposite sides of the symmetry plane; and
a surrounding spherical envelope including phosphor, the light engine disposed at the center of the surrounding spherical envelope, the phosphor being effective to convert light emitted by the light engine to emission light;
wherein each of the first and second LED devices or planar LED device arrays is configured to emit light having a uniform intensity distribution within plus or minus 20% over all emission angles of a hemisphere except angles within 10° of the symmetry plane.

2. The apparatus as set forth in claim 1, wherein each of the first and second LED devices or planar LED device arrays comprises:
at least one light emitting diode (LED) chip; and
at least one optical element configured to refract or scatter light from the at least one LED chip into a uniform distribution over a hemispherical solid angle.

3. The apparatus as set forth in claim 2, wherein the at least one optical element comprises:
an encapsulant encapsulating each LED chip and shaped to refract light emitted by the encapsulated LED chip into a uniform distribution over a hemispherical solid angle.

4. The apparatus as set forth in claim 2, wherein the at least one LED chip comprises a planar array of LED chips.

5. The apparatus as set forth in claim 2, wherein the at least one optical element refracts or scatters light emitted by the at least one LED chip into a uniform distribution within plus or minus 20% over a hemispherical solid angle excluding angles within 10° of the symmetry plane.

6. The apparatus as set forth in claim 1, wherein the light engine emits blue, violet, or ultraviolet light and the phosphor converts the blue, violet, or ultraviolet light emitted by the light engine to white emission light.

7. The apparatus as set forth in claim 1, further comprising a post passing through the surrounding envelope, the light engine being mounted on an end of the post.

8. An apparatus comprising:
a bilaterally symmetrical light engine comprising first and second light emitting diode (LED) devices or planar LED device arrays facing opposite directions, each of the first and second LED devices or planar LED device arrays including at least one optical element comprising a cusped encapsulant corresponding to and encapsulating each LED device and cooperating with the LED device or device array to generate a hemispherical light distribution, wherein the bilaterally symmetrical light engine is configured to emit light having a bilaterally symmetrical intensity distribution that is uniform except at emission angles within 10° of the symmetry plane of the bilaterally symmetrical light engine; and
an envelope including phosphor spaced apart from and surrounding the bilaterally symmetrical light engine, the phosphor being effective to convert light emitted by the light engine to emission light.

9. The apparatus as set forth in claim 8, wherein the bilaterally symmetrical intensity distribution is uniform to within plus or minus 20% except at emission angles within 10° of the symmetry plane of the bilaterally symmetrical light engine.

10. The apparatus as set forth in claim 8, wherein the envelope comprises a spherical envelope and the bilaterally symmetrical light engine is disposed at a center of the spherical envelope.

11. The apparatus as set forth in claim 8, wherein the bilaterally symmetrical light engine further comprises a support having oppositely facing first and second planar surfaces on which the respective first and second LED devices or planar LED device arrays are disposed.

12. The apparatus as set forth in claim 8, wherein the bilaterally symmetrical light engine comprises precisely two LED devices facing opposite directions.

13. The apparatus as set forth in claim 8, wherein the bilaterally symmetrical light engine comprises first and second planar LED device arrays facing opposite directions, the light engine including no additional LED devices other than the LED devices of the first and second planar LED device arrays.

14. An apparatus comprising:
a bilaterally symmetrical light engine comprising first and second light emitting diode (LED) devices or planar LED device arrays facing opposite directions and configured to emit light having a bilaterally symmetrical intensity distribution that is uniform within plus or minus 20% over all emission angles of a hemisphere except at emission angles within 10° of the symmetry plane of the bilaterally symmetrical light engine;
a surrounding envelope including phosphor, the light engine disposed at the center of and spaced apart from the surrounding envelope, the phosphor being effective to convert light emitted by the light engine to emission light; and
a post passing through the surrounding envelope, the bilaterally symmetrical light engine being mounted on an end of the post.

15. The apparatus as set forth in claim 8, wherein the cusped encapsulant includes a convex annular sidewall that is undercut and a concave upper surface.

16. An apparatus comprising:
a light engine comprising:
a light emitting diode (LED) device, and
a cusped encapsulant encapsulating the LED device and cooperating with the LED device to generate a hemispherical light distribution, the cusped encapsulant including a convex annular sidewall that is undercut and a concave upper surface, and
a planar substrate on which the LED device and the cusped encapsulant are disposed with the convex annular sidewall undercut proximate to the substrate, wherein the intensity distribution is uniform to within plus or minus 20% except at emission angles within 10° of the plane of the planar substrate.

17. The apparatus as set forth in claim 3, wherein the encapsulant encapsulating each LED chip and shaped to refract light emitted by the encapsulated LED chip into a uniform distribution over a hemispherical solid angle comprises a cusped encapsulant.

18. The apparatus as set forth in claim 17, wherein the cusped encapsulant includes a convex annular sidewall that is undercut and a concave upper surface.

* * * * *